(12) United States Patent
Jo et al.

(10) Patent No.: US 7,289,278 B1
(45) Date of Patent: Oct. 30, 2007

(54) SUBMINIATURE OPTICAL SYSTEM

(75) Inventors: Yong Joo Jo, Gyunggi-Do (KR); Jong Cheol Park, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/705,537

(22) Filed: Feb. 13, 2007

(30) Foreign Application Priority Data
Feb. 15, 2006 (KR) ........................ 10-2006-0014476

(51) Int. Cl.
*G02B 9/34* (2006.01)
(52) U.S. Cl. ....................................... 359/773; 359/772
(58) Field of Classification Search ................ 359/773, 359/772, 766, 764, 686, 757
See application file for complete search history.

(56) References Cited

U.S. PATENT DOCUMENTS

2007/0070521 A1* 3/2007 Hayakawa .................. 359/686

* cited by examiner

*Primary Examiner*—Timothy Thompson

(57) ABSTRACT

A subminiature imaging optical system suitable for a subminiature optical device such as a mobile phone camera. An aperture stop is provided. A first lens has a positive refractive power and is convex at an object side. A second lens has a negative refractive power. A third lens has a positive refractive power. Also, a fourth lens has a negative refractive power. The optical system has a total length along an optical axis direction according to following relation 1:

$$1.2 < TL/f < 1.5 \quad \text{relation 1,}$$

where TL is a distance from the aperture stop to an image plane, and f is an effective focal distance of an entire optical system.

8 Claims, 6 Drawing Sheets

SUBMINIATURE OPTICAL SYSTEM

CLAIM OF PRIORITY

This application claims the benefit of Korean Patent Application No. 2006-14476 filed on Feb. 15, 2005 in the Korean Intellectual Property Office, the disclosure of which is incorporated herein by reference.

BACKGROUND OF THE INVENTION

1. Field of the Invention

The invention relates to an imaging optical system, and more particularly, to a subminiature imaging optical system which is suitably applicable to a subminiature optical device such as a mobile phone camera.

2. Description of the Related Art

In general, mobile phones featured only a communicative function at an incipient stage. However, with their use broadened, various services such as photographing or image transmission or communication have been in demand, accordingly evolving the function and services thereof. Recently, the spotlight has been given to a new concept of mobile phones, so-called, camera phones or camera mobile phones integrating digital camera technology with mobile phone technology. Moreover, under development have been so-called camcorder mobile phones or camcorder phones which incorporate digital camcorder technology into mobile phone technology to store and transmit video multimedia running for at least ten minutes.

Lately, cameras installed in the mobile phones are required to possess capability of electronic still cameras. Also, photographing lenses face a fierce demand for smaller size, lighter weight and lower cost. Charge-coupled Devices (CCDs) or Complimentary Metal Oxide Semiconductors (CMOSs) in current use are increasingly reduced in their sizes so that the imaging optical system using this imaging device needs to demonstrate high-definition.

Furthermore, the photographing lenses installed in the mobile phones should be less numbered to achieve miniaturization and low cost, which however accompanies limited flexibility in design and unsatisfactory optical capability.

Therefore, this calls for a high-definite subminiature imaging optical system.

SUMMARY OF THE INVENTION

The present invention has been made to solve the foregoing problems of the prior art and therefore an aspect of the present invention is to provide a subminiature imaging optical system which is suitably applicable to a subminiature optical device such as a mobile phone camera using an image sensor, for example, a CCD or CMOS.

Another aspect of the invention is to provide a subminiature imaging optical system which is high-definite and improved in various aberrations with an F number of 2.8 and an angle of view of at least 60 degree.

Further another aspect of the invention is to provide a subminiature imaging optical system which employs a plurality of plastic lenses to ensure lighter weight, easy manufacturability, mass-producibility and less manufacturing costs.

Further another aspect of the invention is to provide a subminiature imaging optical system which adopts an aspherical lens to be high-definite and superior in various optical properties.

According to an aspect of the invention, the subminiature imaging optical system includes an aperture stop; a first lens having a positive refractive power and being convex at an object side; a second lens having a negative refractive power; a third lens having a positive refractive power; and a fourth lens having a negative refractive power, wherein the optical system has a total length along an optical axis direction according to following relation 1, the first and second lenses have an abbe number according to following relation 2, and the first and second lenses have refractive index according to following relation 3:

$$1.2 < TL/f < 1.5 \quad \text{relation 1,}$$

$$|Vd2 - Vd1| > 25 \quad \text{relation 2, and}$$

$$|Nd2 - Nd1| > 0.15 \quad \text{relation 3,}$$

where TL is a distance from the aperture stop to an image plane, f is an effective focal distance of an entire optical system, Vd1 is an abbe number of the first lens, Vd2 is an abbe number of the second lens, Nd1 is a refractive index of the first lens, and Nd2 is a refractive index of the second lens.

Preferably, the first lens has a configuration according to following relation 4, and the second lens has a configuration according to following relation 5:

$$0.3 < r2/f < 0.5 \quad \text{relation 4, and}$$

$$0.5 < r5/f < 3 \quad \text{relation 5,}$$

where r2 is a curvature radius of the first lens at the object side, and r5 is a curvature radius of the second lens at an image side.

Preferably, the third lens has a configuration according to following relation 6 and the fourth lens has a configuration according to following relation 7:

$$0.2 < |r7|/f < 1 \quad \text{relation 6, and}$$

$$0.2 < r9/f < 2 \quad \text{relation 7,}$$

where r7 is a curvature radius of the third lens at the image side (r7<0), and r9 is a curvature radius of the fourth lens at the image side.

Preferably, the second lens has a power according to following relation 8:

$$-0.8 < f2/f < -0.5 \quad \text{relation 8,}$$

where f2 is a focal distance of the second lens (f2<0).

Meanwhile, at least one of refractive surfaces of the first, third and fourth lenses is aspherical.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
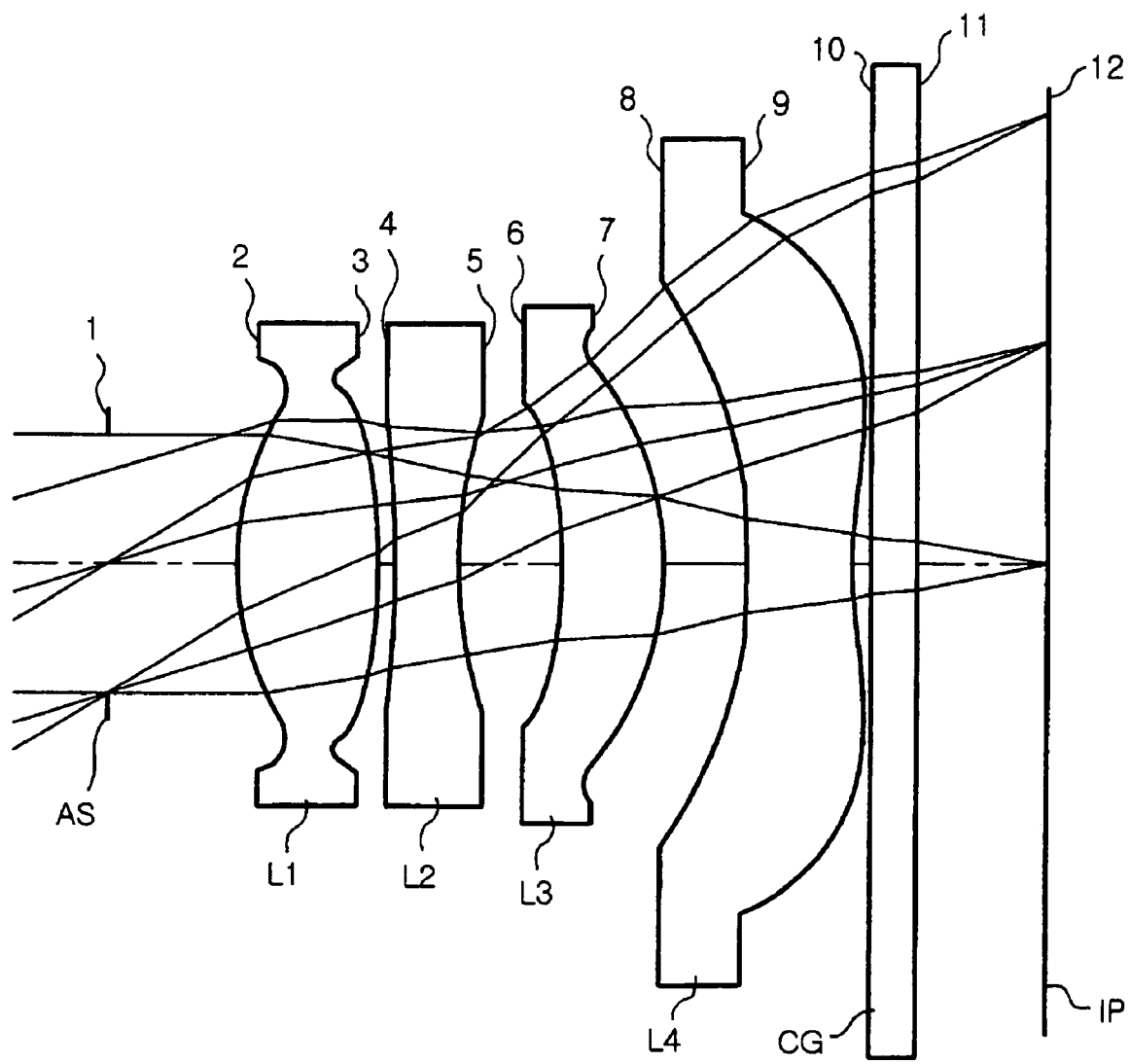
FIG. 1 is a configuration diagram illustrating a subminiature imaging optical system according to a first embodiment of the invention.

FIG. 1 is a lens configuration view illustrating a subminiature imaging optical system according to a first embodiment of the invention. In the following drawings, the thickness, size, shape of the lens are somewhat exaggerated for clarity, and particularly, the shape of a spherical or aspherical surface is illustrative, but not limiting the invention.

As shown in FIG. 1, the subminiature optical system according to the invention includes first to fourth lenses L1 to L4 and an aperture stop AS. The first lens L1 has a positive refractive power and is convex at an object side. The second lens L2 has a negative refractive power and is concave at the object side. The third lens L3 has a positive refractive power and the fourth lens L4 has a negative refractive power. The aperture stop AS is positioned in the nearest vicinity of the object side.

Meanwhile, a cover glass CG is disposed between the fourth lens L4 and an image plane IP to function as a filter such as an infrared ray filter and an optical filter.

Also, the image plane IP serves as an image sensor such as a CCD and CMOS.

In the subminiature imaging optical system according to the invention, the first lens L1 with a positive refractive power has a bigger difference from the second lens L2 with a negative refractive power in terms of an abbe number and refractive index, thus reducing chromatic aberration. What is more, the first and second lenses L1 and L2 have relatively greater power than the third and fourth lenses L3 and L4. This accordingly miniaturizes the optical system. And By optimizing a curvature radius of aspherical and refractive surfaces, superior aberration properties and high-definition are ensured.

Notably, the aspherical lens, when adopted, enhances definition of the lens and diminishes distortion aberration and spherical aberration. This produces a more compact optical system excellent in optical properties.

Furthermore, some portions of the lenses are made of plastics, allowing inexpensive and easy manufacture of the aspherical lens.

With an overall construction as just described, operation and effects of following relations 1 to 8 will be explained hereunder.

A total length of the entire optical system, which is a factor of miniaturization, is defined by relation 1 below:

$$1.2 < TL/f < 1.5 \qquad \text{relation 1,}$$

where TL is a distance from the aperture stop to the image plane, and f is an effective focal distance of an entire optical system.

The distance TL, if in excess of the upper limit, favorably serves to correct aberrations but prolongs the total length of the optical system, which adversely affects subminiaturization thereof. On the other hand, the distance TL, if less than the lower limit, shortens the total length of the optical system too much to satisfy optical properties necessary for the optical system. This also enlarges a manufacturing tolerance, thus undermining capability of the optical system.

Relation 2 concerns correction of chromatic aberration:

$$|Vd2 - Vd1| > 25 \qquad \text{relation 2,}$$

where Vd1 is an abbe number of the first lens, and Vd2 is an abbe umber of the second lens.

In a case where relation 2 falls below the lower limit and thus the first lens L1 has a smaller difference from the second lens L2 in the abbe number, the first and second lenses are increased in chromatic aberration, thus hardly applicable to a high-pixel imaging optical system.

Relation 3 also pertains to correction of chromatic aberration:

$$|Nd2 - Nd1| > 0.15 \qquad \text{relation 3,}$$

where Nd1 is a refractive index of the first lens and Nd2 is a refractive index of the second lens.

In a case where relation 3 falls below the lower limit and thus the first lens L1 has a smaller difference from the second lens L2 in a refractive index, the first and second lenses L1 and L2 are increased in chromatic aberration, thus failing to attain a high-definite image. Moreover, the second lens, if with a smaller refractive index, is reduced in a curvature radius, thereby posing difficulty to manufacture thereof.

Configuration of the first lens L1 is governed by relation 4 below:

$$0.3 < r2/f < 0.5 \qquad \text{relation 4,}$$

where r2 is a curvature radius of the first lens at the object side and f is an effective focal distance of the entire optical system.

If r2 exceeds the upper limit of relation 4, the first lens L1 is reduced in power to hamper miniaturization. This also leads to spherical aberration considerably, thereby failing to obtain a high-definite image and bringing about distortion aberration greatly. On the other hand, if r2 falls short of the lower limit, the first lens L1 is hardly processable and greatly susceptible to manufacturing tolerance to deteriorate spherical aberration and chromatic aberration.

Configuration of the second lens L2 is prescribed by relation 5 below:

$$0.5 < r5/f < 3 \qquad \text{relation 5,}$$

where r5 is a curvature radius of the second lens at the image side and f is an effective focal distance of the entire optical system.

If r5 exceeds the upper limit of relation 5, the total length of the optical system is increased along an optical axis direction, thus adversely affecting miniaturization. This makes the optical system rarely applicable to a small optical device such as a mobile phone, also increasing astigmatic aberration. On the other hand, if r5 falls below the lower limit, the second lens L2 is hardly processable and greatly susceptible to manufacturing tolerance, which hinders mass-producibilty.

Configuration of the third lens L3 is governed by relation 6 below:

$$0.2 < |r7|/f < 1 \qquad \text{relation 6,}$$

where r7 is a curvature radius of the third lens at the image side (r7<0), and f is an effective focal distance of the entire optical system.

|r7| in excess of the upper limit of relation 6 decreases an angle of a main beam incident on an image sensor, thereby hardly applicable to the small optical device such as the mobile phone. Meanwhile, |r7| less than the lower limit renders the third lens L3 hardly processable, and worsens spherical aberration and astigmatic aberration. Thus a high-definition image is not attainable.

Configuration of the fourth lens L4 is defined by relation 7:

$$0.2 < r9/f < 2 \quad \text{relation 7,}$$

where r9 is a curvature radius of the fourth lens at the image side, and f is an effective focal distance of the entire optical system.

If r9 deviates from the upper and lower limits of relation 7, the fourth lens L4 rarely matches the image sensor, thereby reducing a peripheral light amount. Also, if r9 falls short of the lower limit of relation 7, the fourth lens L4 is hardly processable and greatly susceptible to manufacturing tolerance. This accordingly raises manufacturing costs of the lens.

Power of the second lens L2 is defined by relation 8 below:

$$-0.8 < f2/f < -0.5 \quad \text{relation 8,}$$

where f2 is a focal distance of the second lens (f2<0) and f is an effective focal distance of the entire optical system.

If f2 exceeds the upper limit of relation 8 or |f2| is lowered, the curvature radius of the fourth lens L4 is decreased to increase spherical aberrations and astigmatic aberrations, thereby inapplicable to the high-pixel optical system. In contrast, if f2 falls below the lower limit or |f2| is raised, the total length of the optical system along an optical axis direction is increased to hamper miniaturization.

The invention will be explained hereunder through detailed examples.

In each of examples 1 to 3, as described above, an optical system includes an aperture stop AS, a first lens L1, a second lens L2, a third lens L3 and a fourth lens L4 sequentially positioned from an object side to an image side. The first lens L1 has a positive refractive power and is convex at the object side. The second lens L2 has a negative refractive power and is concave at the object side. The third lens L3 has a positive refractive power and the fourth lens L4 has a negative refractive power. Also, a cover glass CG is disposed between the fourth lens L4 and an image plane IP to function as a filter such as an infrared ray filter and an optical filter. The image plane IP serves as an image sensor such as a CCD and CMOS.

The aspherical surfaces of the Examples are obtained from a known equation 1:

$$Z = \frac{cY^2}{1 + \sqrt{1 - (1+K)c^2 Y^2}} + AY^4 + BY^6 + CY^8 + DY^{10} + EY^{12} + FY^{14} + \ldots \quad \text{equation 1}$$

where Z is a distance from a vertex of the lens toward an optical axis direction, Y is a distance toward a direction perpendicular to the optical axis, c is a reciprocal number of a curvature radius r at the vertex of the lens, K is a conic constant, and A,B,C,D,E and F are aspherical coefficients.

In Equation 1 above, 'E and a number following the E' used in a conic constant K and aspherical coefficients A to E represent 10' power. For example, E+01 represents $10^1$ and E-02 represents $10^{-2}$.

EXAMPLE 1

Table 1 below shows exemplary aberrations of a subminiature optical system according to Example 1 of the invention. FIG. 1 is a diagram illustrating lens arrangement of the subminiature optical system according to Example 1 of the invention. FIGS. 2a to 2c are aberrational diagrams illustrating the optical system shown in Table 1 and FIG. 1. Meanwhile, in the following astigmatic aberration diagram, "S" denotes sagittal and "T" denotes tangential.

In Example 1, an F number FNo is 2.8, an angle of view is 60 degree, a distance TL between the aperture stop and the image plane is 6.07 mm, and an effective focal distance f of the optical system is 4.6 mm. Also, in Example 1, the first lens L1, the third lens L3, and the fourth lens L4 are made of plastics.

TABLE 1

| Plane No. | Radius of Curvature R (mm) | Plane Interval t (mm) | Refractive Index $n_d$ | Abbe Number $v_d$ | Remarks |
|---|---|---|---|---|---|
| 1 | ∞ | 0.800000 | | | Aperture stop |
| *2 | 1.70908 | 0.880000 | 1.517 | 64.2 | First lens |
| *3 | −3.75690 | 0.100000 | | | |
| 4 | −10.00000 | 0.400000 | 1.717 | 29.5 | Second lens |
| 5 | 3.00000 | 0.650000 | | | |
| *6 | −3.32694 | 0.640000 | 1.517 | 64.2 | Third lens |
| *7 | −1.47157 | 0.520000 | | | |
| *8 | −4.90739 | 0.660000 | 1.517 | 64.2 | Fourth lens |
| *9 | 2.95153 | 0.100000 | | | |
| 10 | ∞ | 0.300000 | 1.517 | 64.2 | Cover glass |
| 11 | ∞ | 1.041618 | | | |
| 12 | ∞ | 0.000000 | | | Image plane |

In Table 1, * denotes an aspherical surface, and in Example 1, each of the first, third and fourth lens L1, L3 and L4 has aspherical refractive surfaces at both object and image sides.

Table 2 indicates aspherical coefficients of Example 1 according to equation 1.

TABLE 2

| Plane No. | K | A | B | C | D | E |
|---|---|---|---|---|---|---|
| 2 | 0.522377 | −.234643E−01 | −.336270E−01 | .424577E−01 | −.535139E−01 | |
| 3 | 10.547262 | .353553E−01 | .652137E−03 | −.121399E−01 | −.805728E−02 | |
| 6 | 9.633651 | .200737E−01 | −.144113E−01 | −.651534E−01 | .960539E−01 | −.513880E−01 |
| 7 | −2.830075 | −.213015E−01 | −.937901E−02 | .400408E−02 | .298702E−03 | .171375E−02 |
| 8 | 0.000000 | −.729099E−01 | .230266E−01 | −.318335E−02 | .525972E−03 | −.505013E−04 |
| 9 | −18.358599 | −.727648E−01 | .194458E−01 | −.572139E−02 | .960800E−03 | −.801805E−04 |

EXAMPLE 2

Figure 3:
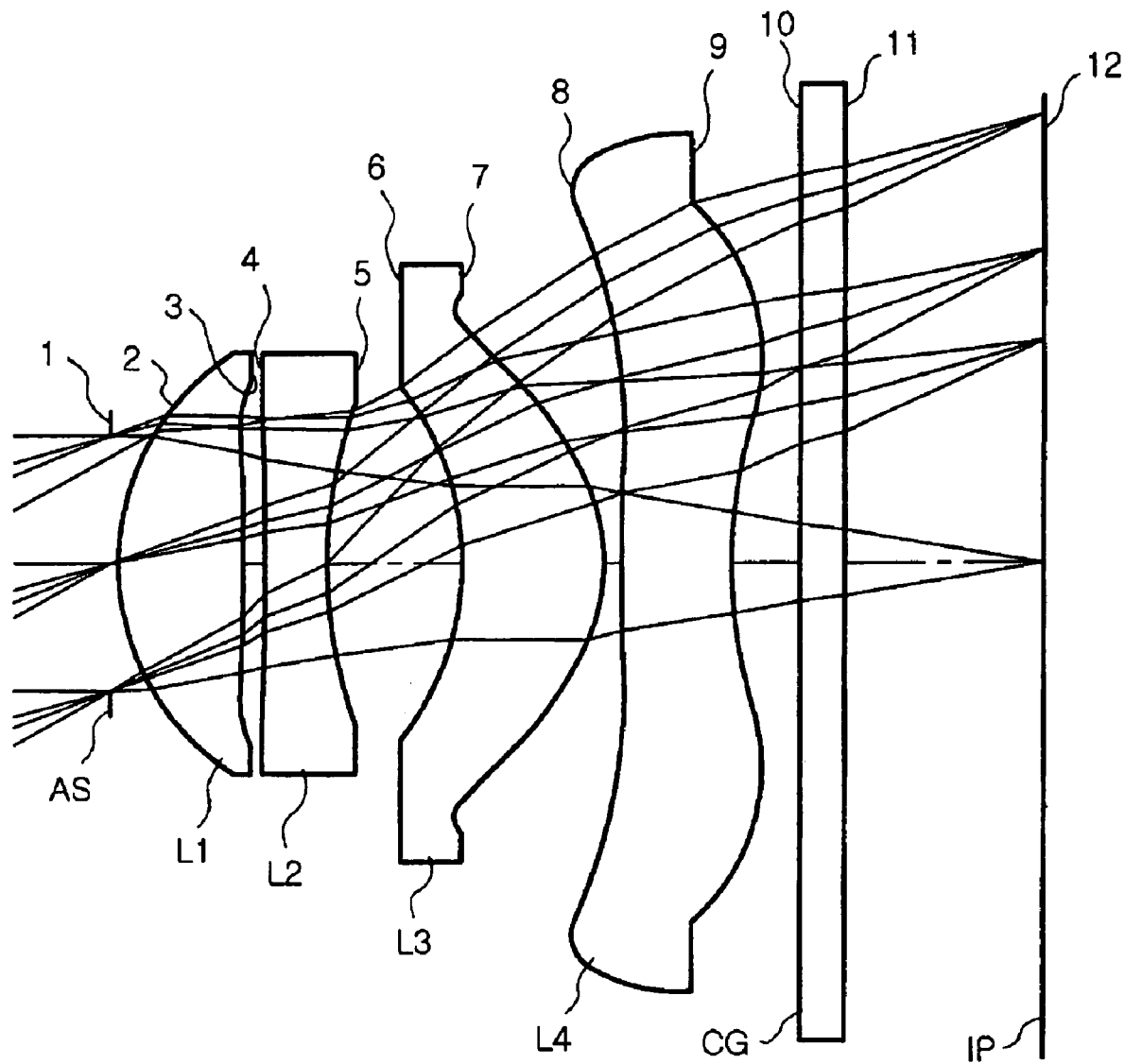
FIG. 3 is a lens configuration diagram illustrating a subminiature imaging optical system according to a second embodiment of the invention.

Table 3 below demonstrates aberrations of a subminiature optical system according to Example 2 of the invention. FIG. 3 is a diagram illustrating lens arrangement of the subminiature optical system according to Example 2 of the invention. FIGS. 4a to 4c are aberrational diagrams illustrating the optical system shown in Table 3 and FIG. 3.

In Example 2, an F number FNo is 2.8, an angle of view is 60 degree, a distance TL between the aperture stop and an image plane is 5.96 mm, an effective focal distance f of the optical system is 4.85 mm. Also, in Example 2, the first, third and fourth lenses L1, L3 and L4 are made of plastics.

TABLE 3

| Plane No. | Radius of Curvature R (mm) | Plane Interval t (mm) | Refractive Index $n_d$ | Abbe Number $v_d$ | Remarks |
|---|---|---|---|---|---|
| 1 | ∞ | 0.050000 | | | Aperture stop |
| *2 | 1.77485 | 0.800000 | 1.529 | 55.8 | First lens |
| *3 | −8.37463 | 0.130000 | | | |
| 4 | −20.98458 | 0.400000 | 1.717 | 29.5 | Second lens |
| 5 | 3.06186 | 0.850000 | | | |
| *6 | −2.41289 | 0.907117 | 1.529 | 55.8 | Third lens |
| *7 | −1.21172 | 0.120000 | | | |
| *8 | 5.10647 | 0.700000 | 1.529 | 55.8 | Fourth lens |
| *9 | 1.61473 | 0.431861 | | | |
| 10 | ∞ | 0.300000 | 1.517 | 64.2 | Cover glass |
| 11 | ∞ | 1.277054 | | | |
| 12 | ∞ | 0.000000 | | | Image plane |

In Table 3, * denotes an aspherical surface. In Example 2, each of the first, third and fourth lenses L1, L3 and L4 has aspherical refractive surfaces at both object and image sides.

Table 4 shows aspherical coefficients of Example 2 according to equation 1.

TABLE 4

| Table 4 Plane No. | K | A | B | C | D | E | F |
|---|---|---|---|---|---|---|---|
| 2 | 0.352384 | −.368033E−02 | .470239E−02 | .132157E−02 | .227750E−02 | | 0.352384 |
| 3 | 21.610845 | .374777E−01 | .131921E−01 | −.482859E−02 | .114908E−01 | | 21.610845 |
| 6 | 3.202010 | −.860629E−02 | .273175E−01 | −.733473E−01 | .639604E−01 | −.144079E−01 | 3.202010 |
| 7 | −1.502458 | −.161397E−01 | −.100420E−01 | −.516868E−02 | .366184E−02 | .144869E−03 | −1.502458 |
| 8 | 0.000000 | −.107288E+00 | .339582E−01 | −.484754E−02 | .643212E−04 | .300424E−04 | 0.000000 |
| 9 | −6.383585 | −.785640E−01 | .226996E−01 | −.516938E−02 | .657959E−03 | −.389789E−04 | −6.383585 |

EXAMPLE 3

Figure 5:
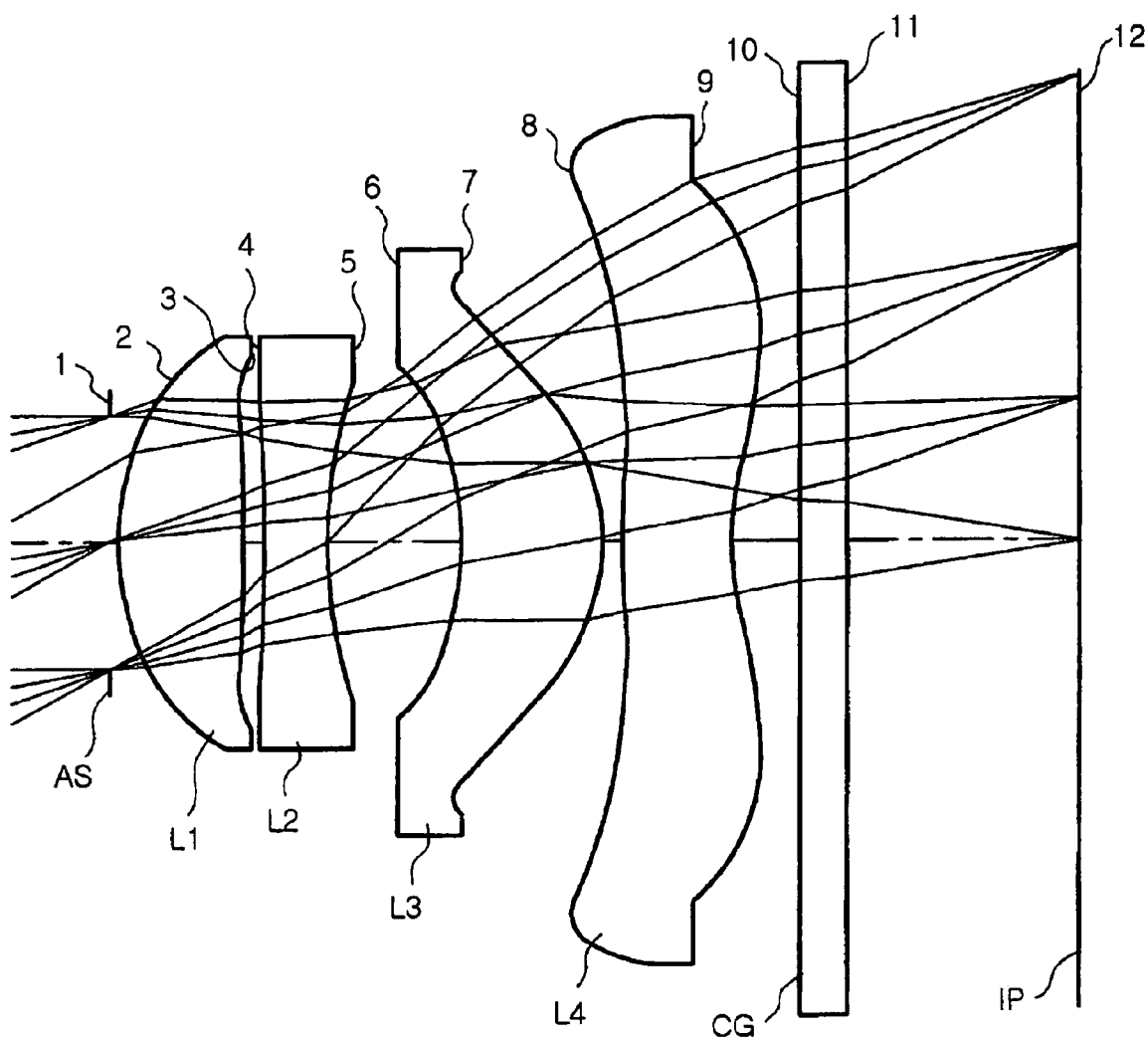
FIG. 5 is a lens configuration diagram illustrating a subminiature imaging optical system according to a third embodiment of the invention.

Table 5 below indicates aberrations of a subminiature optical system according to Example 3 of the invention. FIG. 5 is a diagram illustrating lens arrangement of the subminiature optical system according to Example 3 of the invention. FIGS. 6a to 6c are aberrational diagrams illustrating the optical system shown in Table 5 and FIG. 5.

In Example 3, an F number FNo is 2.8, an angle of view is 60 degree, a distance TL between the aperture stop and an image plane is 7.22 mm, and an effective focal distance f of the optical system is 6 mm. Also, in Example 3, the first, third and fourth lenses L1, L3 and L4 are made of plastics.

TABLE 5

| Plane No. | Radius of Curvature R (mm) | Plane Interval t (mm) | Refractive Index $n_d$ | Abbe number | Remarks |
|---|---|---|---|---|---|
| 1 | ∞ | 0.058564 | | | Aperture stop |
| *2 | 2.07884 | 0.937021 | 1.529 | 55.8 | First lens |
| *3 | −9.80900 | 0.152266 | | | |
| 4 | −24.57873 | 0.468510 | 1.755 | 27.5 | Second lens |
| 5 | 3.58628 | 0.995584 | | | |
| *6 | −2.82616 | 1.062485 | 1.529 | 55.8 | Third lens |
| *7 | −1.41926 | 0.140553 | | | |
| *8 | 5.98108 | 0.819893 | 1.529 | 55.8 | Fourth lens |
| *9 | 1.89129 | 0.505828 | | | |
| 10 | ∞ | 0.351383 | 1.517 | 64.2 | Cover glass |
| 11 | ∞ | 1.733072 | | | |
| 12 | ∞ | 0.000000 | | | Image plane |

In Table 5, * denotes an aspherical surface. In Example 3, each of the first, third and fourth lenses L1, L3 and L4 has aspherical refractive surfaces at both object and image sides.

Table 6 demonstrates aspherical coefficients of Example 3 according to Equation 1.

TABLE 6

| Plane No. | K | A | B | C | D | E | F |
|---|---|---|---|---|---|---|---|
| 2 | 0.352384 | −.229039E−02 | .213315E−02 | .436993E−03 | .548941E−03 | | 0.352384 |
| 3 | 21.610845 | .233236E−01 | .598435E−02 | −.159664E−02 | .276959E−02 | | 21.610845 |
| 6 | 3.202010 | −.535597E−02 | .123921E−01 | −.242532E−01 | .154162E−01 | −.253133E−02 | 3.202010 |
| 7 | −1.502458 | −.100443E−01 | −.455539E−02 | −.170909E−02 | .882604E−03 | .254521E−04 | −1.502458 |
| 8 | 0.000000 | −.667690E−01 | .154045E−01 | −.160290E−02 | .155032E−04 | .527817E−05 | 0.000000 |
| 9 | −6.383585 | −.488929E−01 | .102973E−01 | −.170932E−02 | .158586E−03 | −.684823E−05 | −6.383585 |

Figure 2:
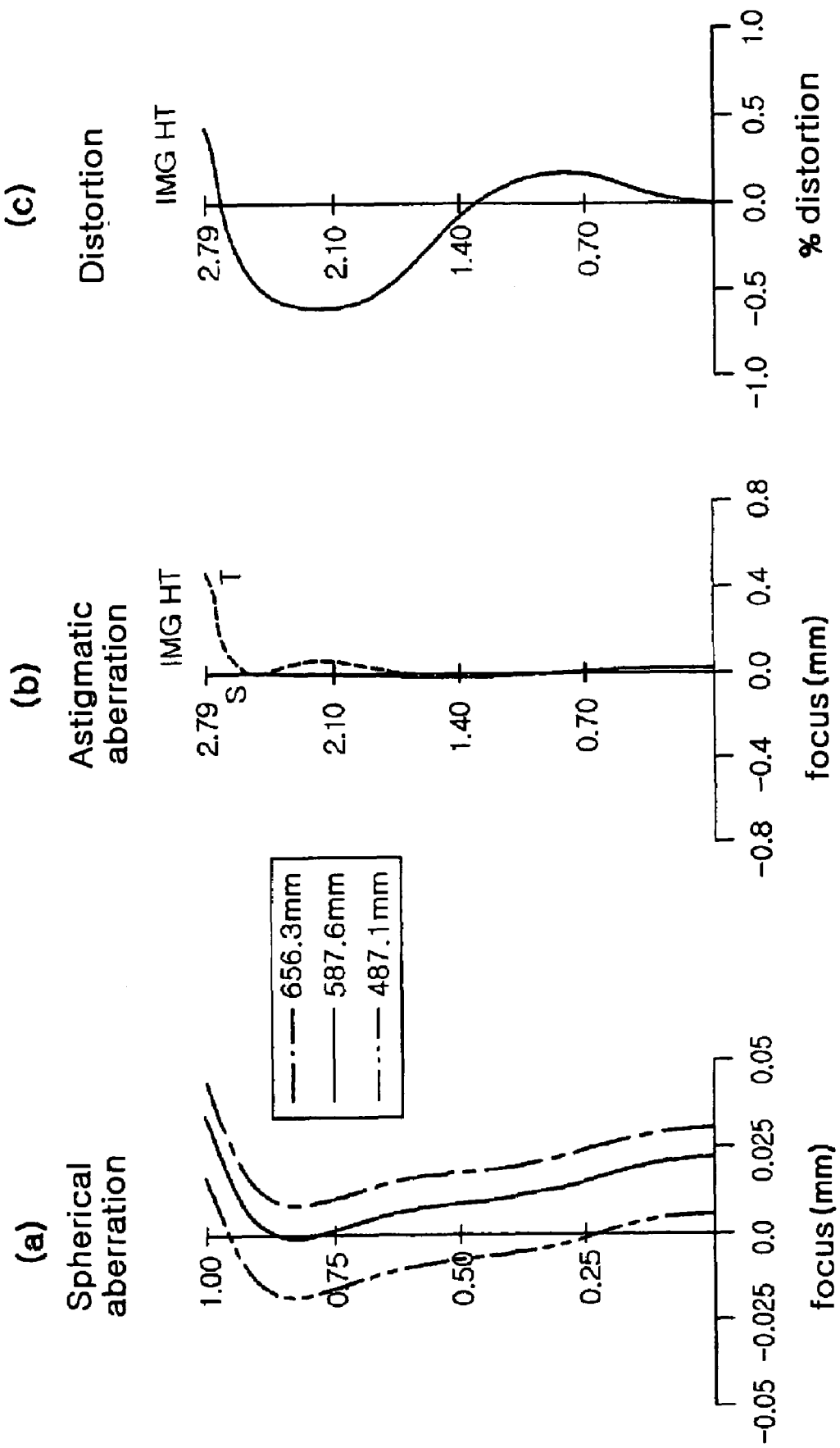
FIG. 2 is an aberrational diagram of the first embodiment shown in FIG. 1, in which (a) illustrates spherical aberration, (b) astigmatic aberration, and (c) distortion.
Figure 4:
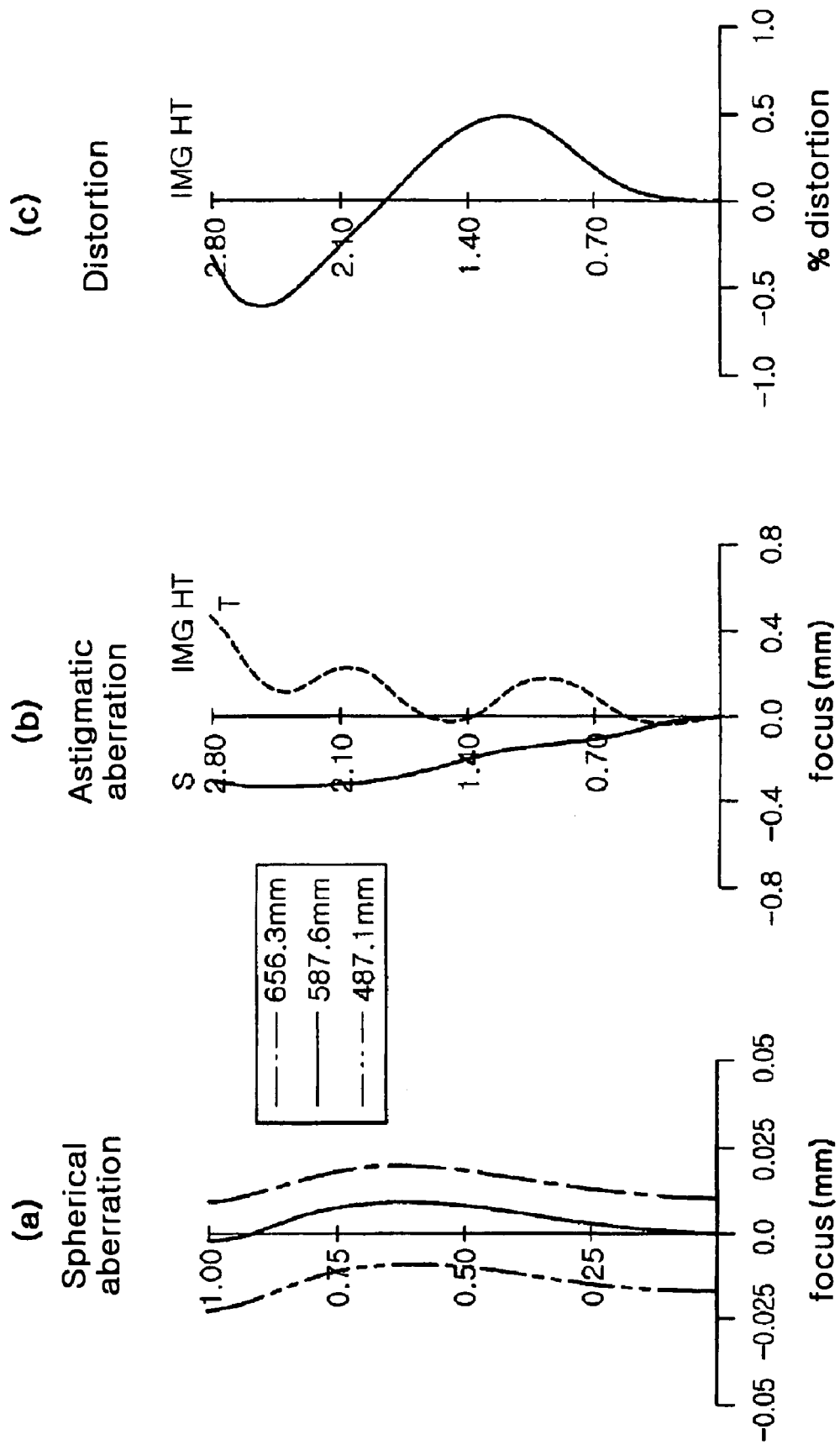
FIG. 4 is an aberrational diagram of the second embodiment shown in FIG. 3, in which (a) denotes spherical aberration, (b) astigmatic aberration, and (c) distortion.
Figure 6:
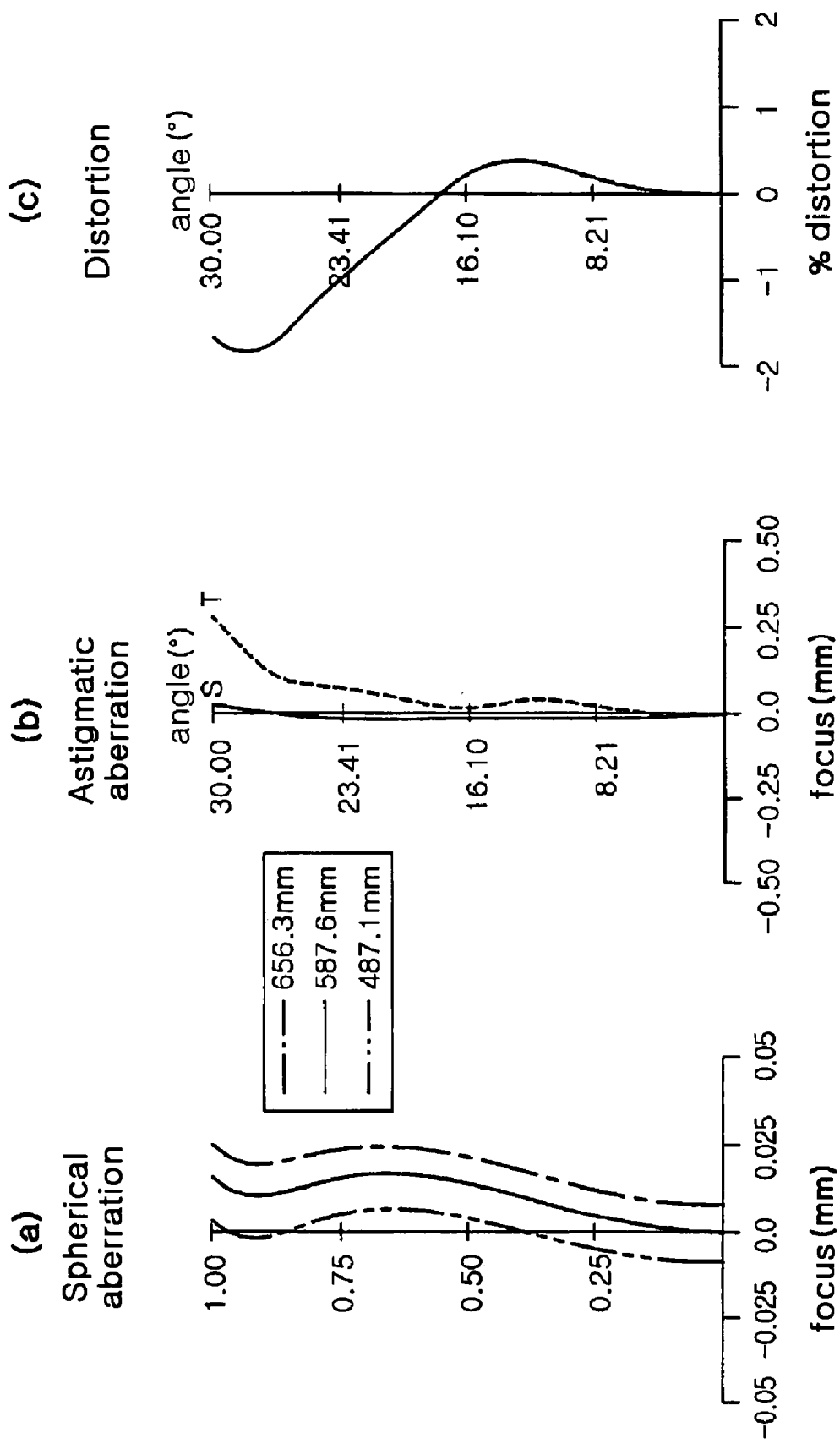
FIG. 6 is an aberrational diagram of the third embodiment shown in FIG. 5, in which (a) denotes spherical aberration, (b) astigmatic aberration, and (c) distortion.

These Examples produce an optical system superior in aberrational properties, as shown in FIGS. 2, 4, and 6. Meanwhile, Table 7 notes values of the equations 1 to 8 with respect to Examples 1 to 3.

TABLE 7

|  | Relation 1 TL/f | Relation 2 |Vd2-Vd1| | Relation 3 |Nd2-Nd1| | Relation 4 r2/f | Relation 5 r5/f | Relation 6 |r7/f| | Relation 7 r9/f | Relation 8 f2/f |
| --- | --- | --- | --- | --- | --- | --- | --- | --- |
| Example 1 | 1.272 | 26.366 | 0.187 | 0.372 | 0.652 | 0.320 | 0.642 | −0.690 |
| Example 2 | 1.223 | 26.299 | 0.188 | 0.364 | 0.628 | 0.248 | 0.331 | −0.758 |
| Example 3 | 1.204 | 28.300 | 0.226 | 0.346 | 0.598 | 0.237 | 0.315 | −0.686 |

As shown in Table 7, Examples 1 to 3 of the invention are found to fulfill the relations 1 to 8.

As set forth above, according to exemplary embodiments of the invention, a subminiature optical system exhibits an F number of 2.8 and an angle of view of 60 degree or more, and is suitably applied to a subminiature optical device such as mobile phone using an image sensor like CCD or CMOS.

Also, the invention adopts first and second lenses that differ significantly in a refractive index and abbe number. This serves to diminish chromatic aberration. Moreover, the first and second lenses are relatively increased in their power to achieve subminiaturization.

Further, a curvature radius of each of refractive surfaces is adjusted and aspherical surfaces are adopted to minimize various aberrations, thereby attaining a high definite image.

In addition, a plurality of plastic lenses are utilized to reduce weight, also assuring easy manufacturability, mass-producibility and less manufacturing costs.

While the present invention has been shown and described in connection with the preferred embodiments, it will be apparent to those skilled in the art that modifications and variations can be made without departing from the spirit and scope of the invention as defined by the appended claims.

What is claimed is:

1. A subminiature imaging optical system comprising:
an aperture stop;
a first lens having a positive refractive power and being convex at an object side;
a second lens having a negative refractive power;
a third lens having a positive refractive power; and
a fourth lens having a negative refractive power,
wherein the optical system has a total length along an optical axis direction according to following relation 1, the first and second lenses have an abbe number according to following relation 2, and the first and second lenses have a refractive index according to following relation 3:

$$1.2 < TL/f < 1.5 \quad \text{relation 1,}$$

$$|Vd2-Vd1| > 25 \quad \text{relation 2, and}$$

$$|Nd2-Nd1| > 0.15 \quad \text{relation 3,}$$

where TL is a distance from the aperture stop to an image plane, f is an effective focal distance of an entire optical system, Vd1 is an abbe number of the first lens, Vd2 is an abbe number of the second lens, Nd1 is a refractive index of the first lens, and Nd2 is a refractive index of the second lens.

2. The subminiature imaging optical system according to claim 1, wherein the first lens has a configuration according to following relation 4, and the second lens has a configuration according to following relation 5:

$$0.3 < r2/f < 0.5 \quad \text{relation 4, and}$$

$$0.5 < r5/f < 3 \quad \text{relation 5,}$$

where r2 is a curvature radius of the first lens at the object side, and r5 is a curvature radius of the second lens at an image side.

3. The subminiature imaging optical system according to claim 1, wherein the third lens has a configuration according to following relation 6 and the fourth lens has a configuration according to following relation 7:

$$0.2 < |r7|/f < 1 \quad \text{relation 6, and}$$

$$0.2 < r9/f < 2 \quad \text{relation 7,}$$

where r7 is a curvature radius of the third lens at the image side (r7<0), and r9 is a curvature radius of the fourth lens at the image side.

4. The subminiature imaging optical system according to claim 1, wherein the second lens has a power according to following relation 8:

$$-0.8 < f2/f < -0.5 \quad \text{relation 8,}$$

where f2 is a focal distance of the second lens (f2<0).

5. The subminiature imaging optical system according to claim 1, wherein at least one of refractive surfaces of the first, third and fourth lenses is aspherical.

6. The subminiature imaging optical system according to claim 2, wherein the third lens has a configuration according to following relation 6 and the fourth lens has a configuration according to following relation 7:

$$0.2 < |r7|/f < 1 \quad \text{relation 6, and}$$

$$0.2 < r9/f < 2 \quad \text{relation 7,}$$

where r7 is a curvature radius of the third lens at the image side (r7<0), and r9 is a curvature radius of the fourth lens at the image side.

7. The subminiature imaging optical system according to claim 2, wherein the second lens has a power according to following relation 8:

$$-0.8 < f2/f < -0.5 \quad \text{relation 8,}$$

where f2 is a focal distance of the second lens (f2<0).

8. The subminiature imaging optical system according to claim 2, wherein at least one of refractive surfaces of the first, third and fourth lenses is aspherical.

* * * * *

UNITED STATES PATENT AND TRADEMARK OFFICE
CERTIFICATE OF CORRECTION

PATENT NO. : 7,289,278 B1 Page 1 of 1
APPLICATION NO. : 11/705537
DATED : October 30, 2007
INVENTOR(S) : Yong Joo Jo et al.

It is certified that error appears in the above-identified patent and that said Letters Patent is hereby corrected as shown below:

On The Title Page Item -57- (Abstract), Line 9, change "<1.5relation" to --<1.5 relation--.

Signed and Sealed this

First Day of April, 2008

JON W. DUDAS
*Director of the United States Patent and Trademark Office*